United States Patent
Shi et al.

(10) Patent No.: US 11,354,452 B2
(45) Date of Patent: *Jun. 7, 2022

(54) SECURE LOGIC CHIP FOR RESISTING HARDWARE TROJAN INDUCED LEAKAGE IN COMBINATIONAL LOGIC

(71) Applicant: Government of the United States, as Represented by the Secretary of the Air Force, Rome, NY (US)

(72) Inventors: Yiyu Shi, Granger (CH); Travis Schulze, St. Louis, MO (US); Kevin Kwiat, Sarasota, FL (US); Charles Kamhoua, Potomac, MD (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,743

(22) Filed: Oct. 30, 2018

(65) Prior Publication Data
US 2020/0026887 A1 Jan. 23, 2020

Related U.S. Application Data

(62) Division of application No. 15/279,639, filed on Sep. 29, 2016, now abandoned.

(51) Int. Cl.
*G06F 21/76* (2013.01)
*G06F 21/75* (2013.01)

(52) U.S. Cl.
CPC ............ *G06F 21/76* (2013.01); *G06F 21/755* (2017.08)

(58) Field of Classification Search
CPC ....... H04L 9/00; H04L 9/002; H04L 2209/12; G06F 21/755; G06F 2207/7266; G06F 30/20; G06F 21/76; G06F 21/60; G06F 21/567
See application file for complete search history.

(56) References Cited

U.S. PATENT DOCUMENTS

| | | | | |
|---|---|---|---|---|
| 8,395,408 | B2* | 3/2013 | Tanimura | H03K 19/003 326/8 |
| 8,418,006 | B1* | 4/2013 | Trimberger | G09C 1/00 714/725 |
| 9,620,473 | B1* | 4/2017 | Hall | H01L 24/17 |
| 10,311,255 | B2* | 6/2019 | Leiserson | G06F 21/755 |
| 2003/0140240 | A1* | 7/2003 | Jaffe | H04L 63/1441 713/193 |
| 2004/0223383 | A1* | 11/2004 | Kunemund | H03K 3/356139 365/200 |

(Continued)

*Primary Examiner* — Lizbeth Torres-Diaz
(74) *Attorney, Agent, or Firm* — AFRL/RIJ; Randall P. Jones

(57) ABSTRACT

The invention is a secure logic chip with resistance to hardware Trojan induced data leakage. The invention solves the untrustworthy fabrication risk problem by introducing a secure logic chip design such that even when the design is entirely known to an attacker and a data leakage Trojan is injected subsequently, no useful information can be obtained. This invention contains several features including randomized encoding of binary logic, converting any combinational binary logic into one with randomized encoding, and partitioning a randomized encoded logic for split manufacturing.

4 Claims, 7 Drawing Sheets

(56) References Cited

U.S. PATENT DOCUMENTS

| | | | |
|---|---|---|---|
| 2005/0193052 A1* | 9/2005 | Elbe | G06F 7/509 708/700 |
| 2005/0273630 A1* | 12/2005 | Shu | G06F 9/30101 712/E9.035 |
| 2007/0063742 A1* | 3/2007 | Janssen | G06F 7/501 327/57 |
| 2009/0112896 A1* | 4/2009 | Golic | H04L 9/003 |
| 2011/0037625 A1* | 2/2011 | Joyce | G06F 40/149 341/51 |
| 2012/0105099 A1* | 5/2012 | Tanimura | H03K 19/096 326/8 |
| 2013/0129083 A1* | 5/2013 | Fujino | G06F 7/584 708/252 |
| 2014/0292371 A1* | 10/2014 | Di | H04L 9/003 326/95 |
| 2016/0063148 A1* | 3/2016 | Hayashi | G06F 30/20 703/2 |
| 2017/0124354 A1* | 5/2017 | Rohleder | G06F 21/70 |
| 2017/0154193 A1* | 6/2017 | Leiserson | G06F 21/71 |
| 2018/0089426 A1* | 3/2018 | Shi | G06F 21/76 |
| 2018/0137290 A1* | 5/2018 | Kwiat | H04L 63/162 |
| 2018/0205535 A1* | 7/2018 | Choi | H04L 9/002 |
| 2018/0294960 A1* | 10/2018 | Bitauld | H04B 10/548 |
| 2019/0028263 A1* | 1/2019 | Avital | G06F 21/755 |
| 2020/0026887 A1* | 1/2020 | Shi | G06F 21/76 |
| 2020/0159967 A1* | 5/2020 | Hershman | G06F 21/75 |

* cited by examiner

| Logic | Code |
|-------|----------|
| 0 | 00 or 11 |
| 1 | 10 or 01 |

SECURE LOGIC CHIP FOR RESISTING HARDWARE TROJAN INDUCED LEAKAGE IN COMBINATIONAL LOGIC

RELATIONSHIP TO OTHER PENDING APPLICATIONS

This patent application is a divisional of and claims any and all priority benefit from U.S. patent application Ser. No. 15/592,096 filed on Sep. 29, 2016, now and incorporated by reference in its entirety herein.

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to the field of technology and processes that prevent or reduce data leakage in electronic devices through means of a malicious hardware device or apparatus. More specifically, it relates to a method and apparatus for resisting hardware Trojan induced data leakage in combinational logics.

2. Brief Description of the Related Art

The ever-increasing cost of technology scaling has forced many design houses to outsource their semiconductor fabrication process to lower cost countries. Accordingly, chip manufacturing has become a global enterprise. However, this presents a problem when sensitive designs must be surrendered to the manufacturer before production. These manufacturers may not have secure facilities or processes, and their trustworthiness remains unknown. The opportunity therefore exists for malicious parties, or attackers, to re-engineer the original design by inserting malicious hardware, usually referred to as "hardware Trojans".

Hardware Trojans are malicious modifications to the underlying hardware, or circuitry, of a circuit chip. It is possible for chip fabrication and design to occur at multiple facilities outside of a company's control. This results in companies having to rely on multiple offshore foundries or reliance on commercial off the shelf hardware. Each aspect of a chip development outside the control of the underlying company presents an avenue for a malicious party or attacker to insert a hardware Trojan. This can be especially concerning for military systems, such as aerospace and defense platforms.

After insertion of the hardware Trojan the original functionality of the chip is maintained with little to no increase in area or power consumption, making it very difficult to detect the attack during testing. At runtime, they are triggered either externally or by a carefully designed sequence of internal signals to obtain the payload. An important type of payload is data leakage, and the corresponding hardware Trojan is referred to as "data leakage Trojan". Data leakage Trojans are particularly dangerous because they generally will not affect the normal operation of chips. Instead, the Trojan creates side channels to scan and capture data, such as an encryption key as it is processed or to possibly allow privilege escalation on a system.

Successful execution of a Trojan circuit relies on the attacker's ability to understand the design of the chip. This can be accomplished before fabrication by analyzing the netlist and layout, or afterwards by procuring a fabricated chip (e.g., on the market) and reverse-engineering it.

Current methods of combating hardware Trojans include runtime monitoring, post-silicon testing, and design for security (DFS). Runtime monitoring, a type of functional testing, involves analysis of a running system to determine whether the observed behaviors satisfy or violate specified properties. In regards to hardware Trojans, they are utilized to attempt to detect any abnormalities presented by the hardware Trojan. Likewise, post-silicon testing, another functional testing, involves tests on actual devices running in "real world" system boards utilizing logic analyzer and assertion-based tools. In other words, post-silicon testing is another form of validating how the chip runs in a real world environment against the expected norms in an attempt to detect abnormalities, such as hardware Trojans. DFS focuses on the design process of manufacturing in an attempt to reduce the potential for a malicious party to insert malicious hardware.

Runtime monitoring and post-silicon testing both try to detect the abnormal behaviors of the chip when hardware Trojans are triggered, yet they are ineffective on data leakage Trojans which do not change the chip's normal behavior. The flaws associated with functional testing are well known and discussed in the article titled, Testing for Hardware Trojans: A Game-Theoretic Approach, by C. Kamhoua, M. Rodriguez and K. Kwiat, herein incorporated by reference. In the article, the authors discuss the need to improve functional testing by adding in a game theory approach to increase the probability of detecting and defeating hardware Trojans in digital logic. However, the authors seem to acknowledge that, while a game theory approach may improve detection, it does not prevent a sophisticated hardware Trojan from by passing functional testing. In addition, functional testing can reach a level where it becomes unfeasible or cost prohibitive to continue.

DFS, on the other hand, focuses on making the design harder for the attacker to understand, either through obfuscation, layout camouflaging or split manufacturing. A Primer on Hardware Security: Models, Methods, and Metrics. Proc. of the IEEE, written by M. Rostami, F. Koushanfar and R. Karri., as well as Security Analysis of Logic Obfuscation. Design Automation Conference (DAC), by J. Rajendran, Y. Pino, O. Sinanoglu and R. Karri, herein incorporated by reference, discusses methods and techniques associated with DFS. These DFS methods focus on increasing the difficulty of establishing data leakage channels by the hardware Trojan. However, they can still be compromised when the same design undergoes multiple fabrication runs, and attackers can procure a fabricated chip from one run and reverse-engineer the design. The hardware Trojans can then be designed and injected in subsequent runs. However, there exists no current process to prevent data leakage when side channels are successfully established. As most commercial designs are fabricated in multiple runs, this becomes a challenge designers have to address.

Accordingly, there exists a need for a device that can put forward a randomized encoding scheme for combinational logics for resistance to data leakage. Additionally, there exists a need for a device that can achieve protection from leakage Trojans even when the outsourced portion of a design is completely known to the attacker.

However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for an apparatus for reducing data leakage alongside channels caused by hardware Trojans is achieved through the creation of combinational logics within a chip. In one embodiment a security apparatus on a logic circuit, having at least one pair of decodable inputs and at least one pair of decodable outputs, contains a pair of logic inputs connected to an external data source. A random logic state generator is used to randomly output a random logic state, such as 1 or 0. It is foreseeable that other logic states, or bits could be used in a more complex system. The random logic state is then sent to a first logic gate for encoding the random logic state and one of a pair of logic inputs in order to produce a pair of encoded logic outputs. In a preferred embodiment the first logic gate encodes according to an exclusive OR (XOR) operation. It is foreseeable that other types of logic gates could be used in order to achieve the initial encoding known to those who have an understanding of the field, such as AND, OR, NOT, NAND, etc. The encoded logic outputs are connected to at least one pair of decodable inputs. In a preferred embodiment the decodable inputs come from at least two logic blocks. It is important to note that while an embodiment at the simplest level of the present invention contains two logic blocks it is foreseeable that there could be multiple logic blocks communicating with each other. The at least two logic blocks are identical except for having at least one inverter. Multiple inverters may be placed and used throughout the at least two logic blocks as long as the two logic blocks do not contain an identical setup. A multiplexer selects the at least one pair of the encoded outputs from the at least two logic blocks and a second logic gate for un-encoding the selected encoded output of the external data source and the random logic state so as to produce an un-encoded output. In a preferred embodiment, the second logic gate is an XOR gate, although, as in the first logic gate, it is foreseeable that other logic gates could be used. It is important to note that the logic circuit could contain multiple security apparatuses within one chip.

The present invention may also be utilized as a security method for use within a logic circuit having at least one pair of decodable inputs and at least one pair of un-encoded outputs. In a preferred embodiment the method includes generating a random binary logic state, encoding the logic state with input data according to a first Boolean function in such a manner as to produce an encoded input data. The encoded input data and the input data are applied to at least one pair of decodable inputs. In an embodiment of the present invention, the decodable inputs may then go through a logic block containing one or more inverters. One encoded output of the at least one pair of encoded outputs is then selected. The selected encoded output and the random binary logic state are then un-encoded according to a second Boolean function in such a way as to produce an un-encoded output. In a preferred embodiment the first and second Boolean functions are performed by an XOR gate; although it is foreseeable that other gates can perform the same function.

In a preferred embodiment, the security apparatus described herein exists on a single, securely fabricated input/output chip. The securely fabricated input/output chip can communicate and interact with the external data source through quilt packaging. Quilt packaging allows two chips of different sizes and technologies to be fabricated separately and then joined. Other techniques and methods can be used to combine the chips.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

For a fuller understanding of the invention, reference should be made to the following detailed description, taken in connection with the accompanying drawings, in which:

FIG. 2 is an example of a two-bit randomized encoding (dual-rail encoding);

DETAILED DESCRIPTION OF THE PREFERRED EMBODIMENT

In the following detailed description of the preferred embodiment, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a". "an", and "the" include plural referents unless the content clearly dictates otherwise. As used in this specification and the appended claims, the term "or" is generally employed in its sense including "and/or" unless the context clearly dictates otherwise.

This novel invention will be described in three parts with reference to the attached figures throughout. The purpose of addressing the invention this way is to set up the architecture and framework in which the apparatus works and then illustrate specific examples of its functionality and application. First, an embodiment will be shown describing designs with data leakage hardware Trojans injected in an effort to illustrate how a hardware Trojan may operate. Second, several embodiments of the present invention will be presented to show a new randomized encoding scheme to randomize the information processed in a combinational logic. Third, a procedure will be shown for implementing and using the randomized encoding scheme in designing logic functions with resistance to information leakage caused by hardware Trojans injected.

Figure 1:
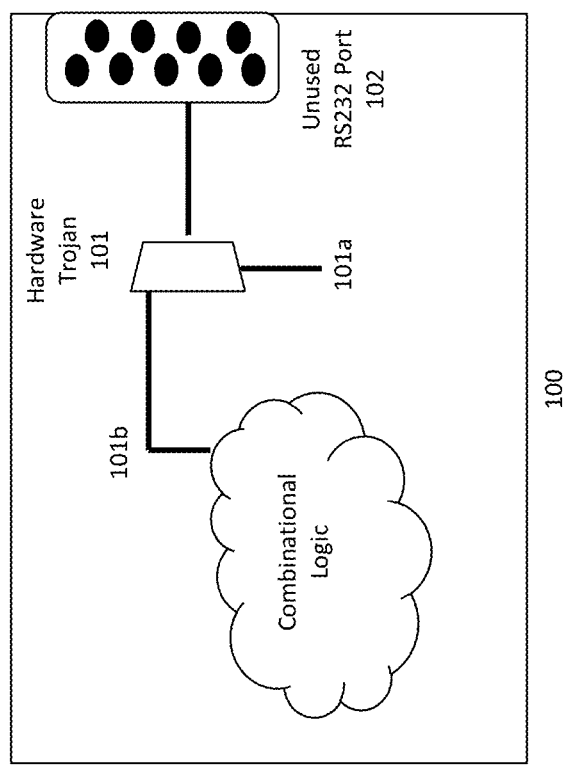
FIG. 1 illustrates one example of how a hardware Trojan can be used to obtain information.

Referring to FIG. 1, one type of embodiment for a combinational logic used by a hardware Trojan is shown at 100. A hardware Trojan in the form of a Multiplexer (MUX) 101 is injected. When the select signal 101*a* is set to 0, the virus is not triggered and the combinational logic 100 operates normally. When the select signal 101*a* is set to 1, the virus is triggered and some binary bits 101*b* selected by the attacker from the combinational logic 101*c* is sent directly to an unused RS232 port 102, which can then be obtained by an attacker. While a RS232 port is used as an example, it is foreseeable that other connection ports can be used. Similar mechanisms can be used to create other types of side channels for data leakage.

To successfully inject a data leakage Trojan an attacker must be able to identify the gates and understand the function of a design. With this in mind, existing methods have focused on making the design harder to interpret. The current state of the art revolves around obfuscation, layout camouflaging, and split manufacturing. Obfuscation aims to make the function of the circuit less obvious by using nonstandard designs for common functions. Obfuscation can also be performed on state machines in the design, additional states are added leading to dead ends or black hole states. Layout camouflaging attempts to disguise the design by making the layouts of each gate indistinguishable. Extracting the netlist using image based techniques on the layout mask then becomes difficult. Finally, split manufacturing attempts to break up the design into front-end and back-end layers. The front-end consists of the lower silicon layers and first metal layers, the back-end being the remaining metal layers. Splitting the fabrication prevents an attacker in one location from having access to the complete design.

All of these existing countermeasures attempt to hide design information from attackers and can be defeated if the same design is to be manufactured by multiple fabrication runs and an attacker can procure a chip in between and reverse engineering the design to obtain the full design information. Our method is a useful and a non-trivial solution to address this unsolved problem, and may be shown by several different embodiments.

Figure 2:
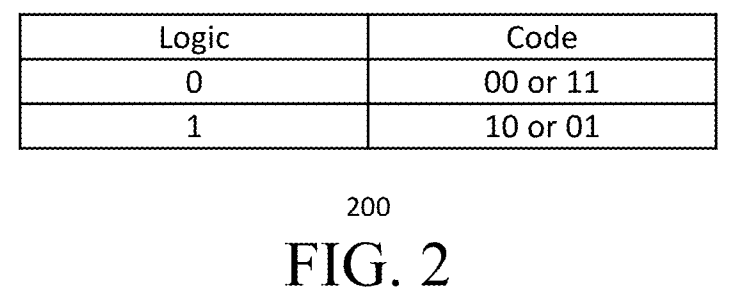

The following embodiments of the present invention utilize randomized encoding to hide information. To accomplish this, the invention uses a set of non-overlapping codes to encode logic values. To provide multiple representations (redundancy) so that randomness can be introduced, we need more than one bit to encode logic zero and logic one. Referring to FIG. 2, an example 200 is given where two bits are used.

In this example (referred to as randomized dual-rail encoding), among the four code combinations 00, 01, 10, and 11, we use 00 and 11 to encode zero, and 01 and 10 to encode one. There are other embodiments where the code length and assignment can be different, but for the purpose of this embodiment and the embodiments described hereon, it is used so one skilled in the art may follow all the examples easily.

One of the two rails in the randomized dual-rail encoding will be generated from a random number generator. In this embodiment and the embodiments hereon, we refer to this rail as the random rail. The conversion between conventional logic and the corresponding randomized dual-rail logic then becomes straightforward. For any conventional binary logic value x and given the random logic value r on one of the two rails in dual-rail representation, the logic on the other rail can be decided through an XOR gate as t=x E8 r. In randomized dual-rail logic, the signals on both rails must be known at the same time to decode the value. Protecting the value then converts to protecting the random bit r of each signal from being identified by hardware Trojans.

Figure 3:
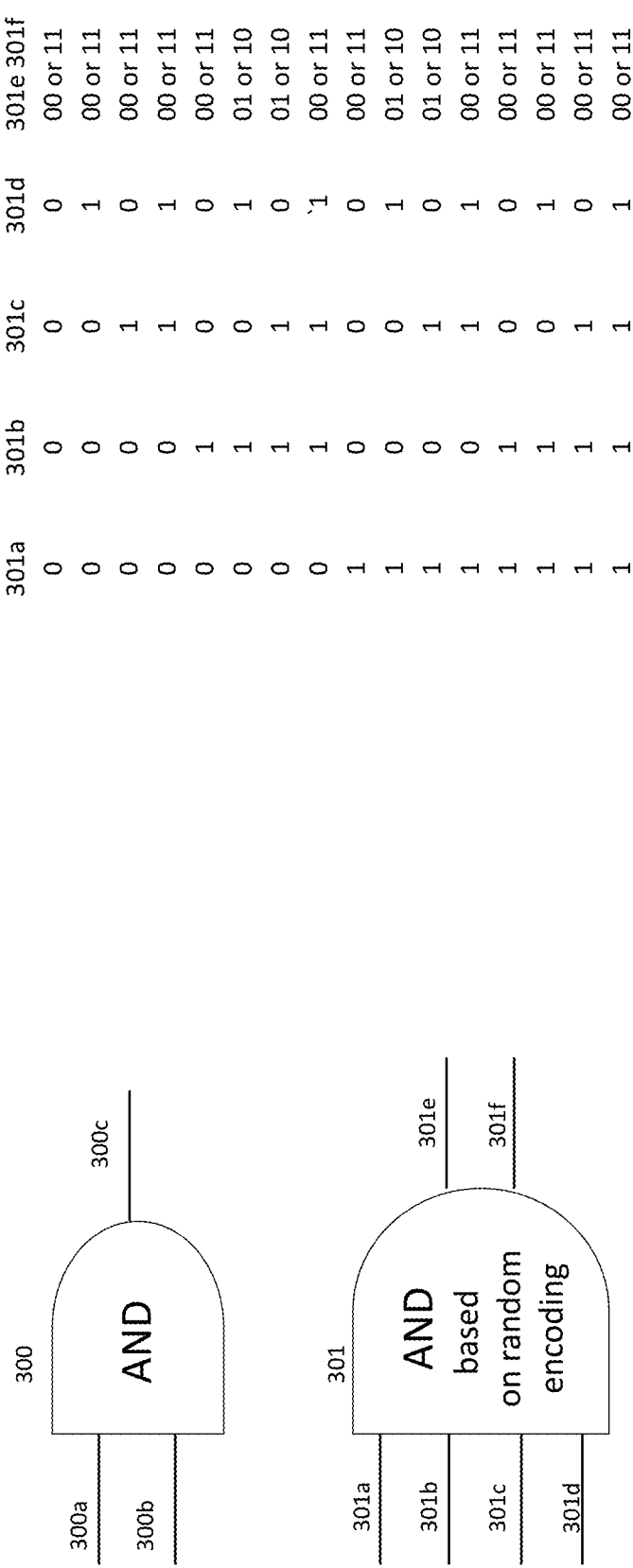
FIG. 3 is an illustration of an AND gate and the corresponding truth table in randomized dual-rail logic.

The following embodiment shows an approach of converting conventional logic to randomized dual-rail logic based on multiplexer (MUX). Refer to FIG. 3 for an AND gate as an example. A conventional AND gate 300 with two inputs (300*a*, 300*b*) and one output 300*c* is converted to a randomized dual-rail gate 301 with four inputs (301*a*. 301*b*, 301*c*, 301*d*) and two outputs (301*e*, 301*f*). (301*a*. 301*b*) encodes input 300*a*, (301*c*, 301*d*) encodes input (300*b*), and (301*e*, 301*f*) encodes output (300*c*) in gate 300. Using the coding scheme 200, the truth table 302 for gate 301 can be derived. As the truth table is not unique, there can be many different corresponding implementations.

Figure 4:
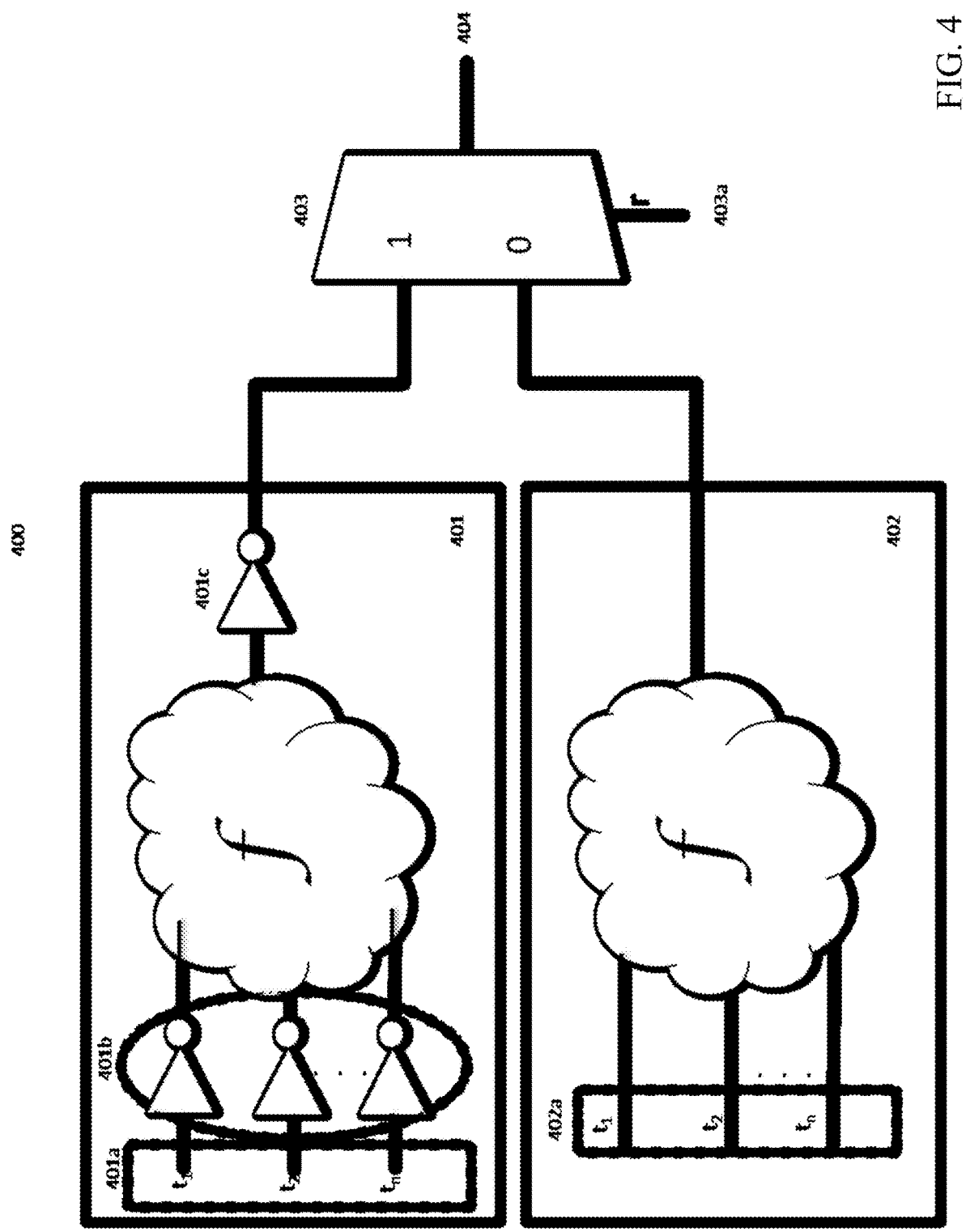
FIG. 4 is an embodiment of the MUX-based implementation method of randomized encoding scheme for a combinational logic.

To minimize the overhead while maintaining the randomness needed for security, and to allow easy conversion from conventional logic to randomized dual-rail logic, we can let all the gates in a combinational logic share the same random rail. As such, any given Boolean function $f(x_1, x_2, x_3)$ with $x_1, x_2, x_3, \ldots$ as Boolean variables can be converted to the corresponding dual-rail representation $$f(x_1, x_2, x_3, \ldots) \rightarrow (f(t_1 \oplus r, t_2 \oplus r, t_3 \oplus r, \ldots) \oplus r, r) \quad \text{(EQN. 1)}$$

where r is the random logic value on the common random rail, and $t_1, t_2, \ldots$ are the logic values on the other rail for signals $x_1, x_2, \ldots$, respectively. Refer to FIG. 4 for the corresponding randomized dual-rail implementation 400 of f. The two logic blocks 401 and 402 are identical except the additional inverters 401*b* at each of the inputs 401*a* ($t_1$, $t_2, \ldots$) and the additional inverter at the output 401*c*. A MUX 403 with r as select signal 403*a* is used to decide the final output 404. The output 404 is also in dual-rail representation with random rail r (i.e., what the final single-rail logic value should be).

Such a MUX-based conversion has approximately an area and power overhead of 2x, and applies to any Boolean function. In addition to reducing overhead, one additional benefit is the clearly separated random signal, r. As long as this signal and the final MUX are hidden from the attacker, then the information obtained from any other portion of the circuit cannot be directly decoded.

The MUX-based conversion can have different variations in terms of practical implementation. For example, it is not necessary to convert all the inputs to dual-rail. Changing just the first input, $x_1$, of any function to dual-rail gives the same effect as converting all the inputs. The corresponding dual-rail representation of a function f is as follows $$f(x_1, x_2, x_3, \ldots) \rightarrow (f(t_1 \oplus r, x_2, x_3, \ldots) \oplus r, r) \quad \text{(EQN. 2)}$$

The first rail can be re-cast as $$f(t_1 \oplus r, x_2, x_3, \ldots) \oplus r = rf(t_1 \oplus 1, x_2, x_3, \ldots) \oplus 1 + \overline{r}f(t_1 \oplus 0, x_2, x_3 \ldots) \oplus 0 = r\overline{f(t_1, x_2, x_3, \ldots)} + \overline{r}f(t_1, x_2, x_3 \ldots) \quad \text{(EQN. 3)}$$

Figure 5:
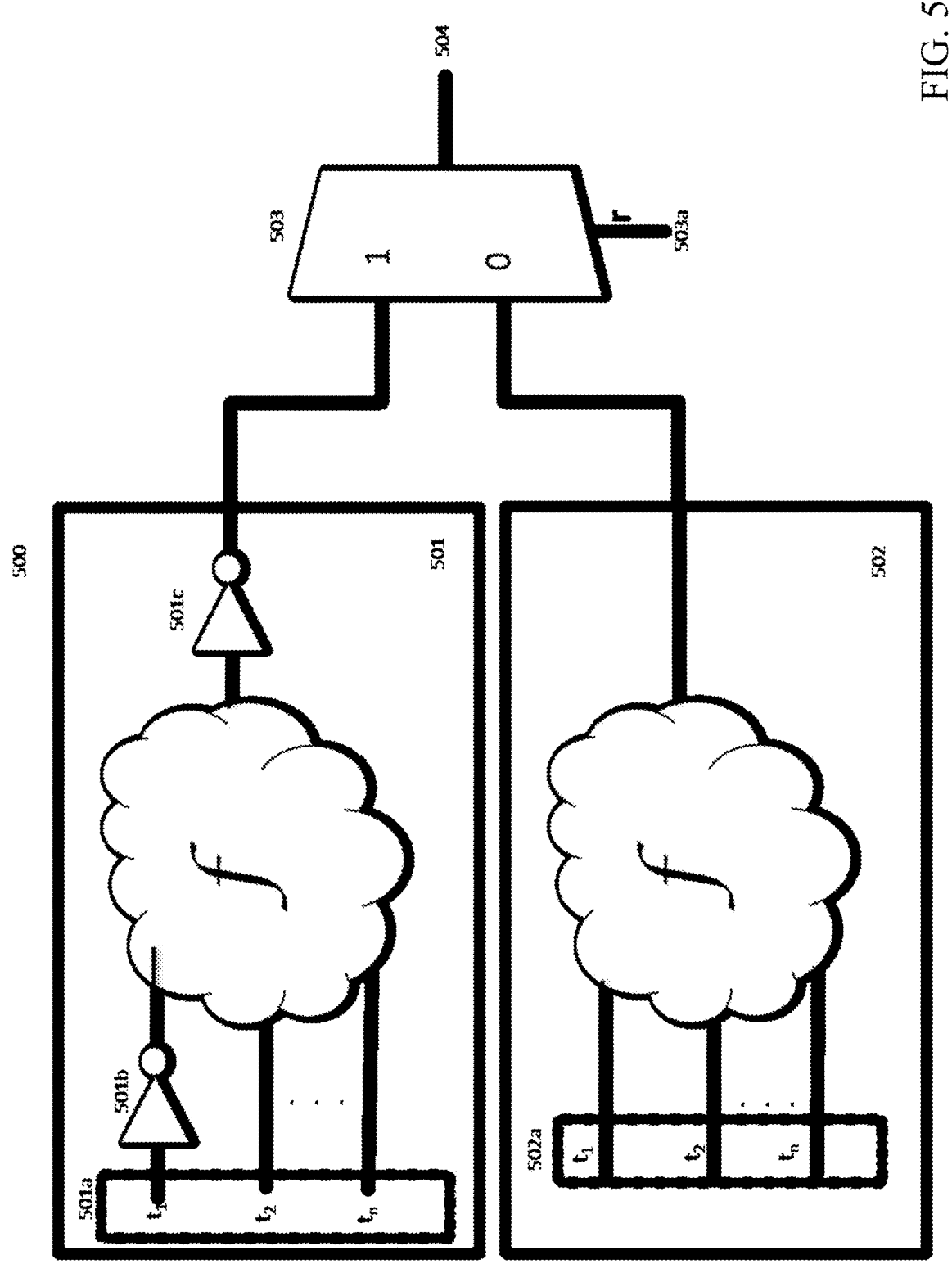
FIG. 5 is one embodiment of an alternative MUX-based implementation method of randomized encoding scheme for a combinational logic.

Refer to FIG. 5 for the corresponding randomized dual-rail implementation 500. The two logic blocks 501 and 502 are identical except the additional two inverters 501*b*, 501*c* at input $t_1$ and at the output. A MUX 503 with r as select signal 503*a* is used to decide the final output 504. The output 504 is also in dual-rail representation with random rail r (i.e., the final single-rail logic value should be g E8 r). Compared with the implementation 400, this different implementation will result in different power and area overhead. One skilled in the art can easily create other variations following similar process described in this embodiment.

For the randomized dual-rail logic to be effective, it must protect the random rail as well as the final MUX, such that any data obtained from elsewhere on the chip cannot be directly interpreted. This is a significant advantage over any existing methods, where part of the information can be obtained if any part of the chip is compromised. The following embodiment will explain how the randomized dual-rail implementation can be effectively protected from data leakage hardware Trojans.

The protection is based on the existing technology of Quilt Packaging, see G. H. Bernstein, P. Fay, W. Porod, Q. Liu. Interconnect packaging systems. U.S. Pat. No. 7,608,919 B1, 2006, which allows two chips of different sizes and technologies to be fabricated separately and then joined. The Quilt Packaging process creates a high speed, low loss connection with measured insertion losses of only 1 dB at 110 GHz and 2.25 dB at 220 GHz. The different chips can be of dissimilar materials. Si, SiGe, GaAs or InP, can all be integrated together into a single package. The dies, having been prefabricated with the appropriate connections, can be attached using several methods including Sn immersion plating and pin transfer of solder paste.

Based on Quilt Packaging, the dual-rail randomized design can be partitioned so that a secure I/O area of the chip design is fabricated separately. The I/O area includes the random number generator, the XOR gates for conversion between single-rail and dual-rail, and the output selection MUXes. These require a chip of small area relative to the remainder of the design. The two dies can then be combined using the Quilt Packaging in a trusted facility through some easy steps.

Figure 6:
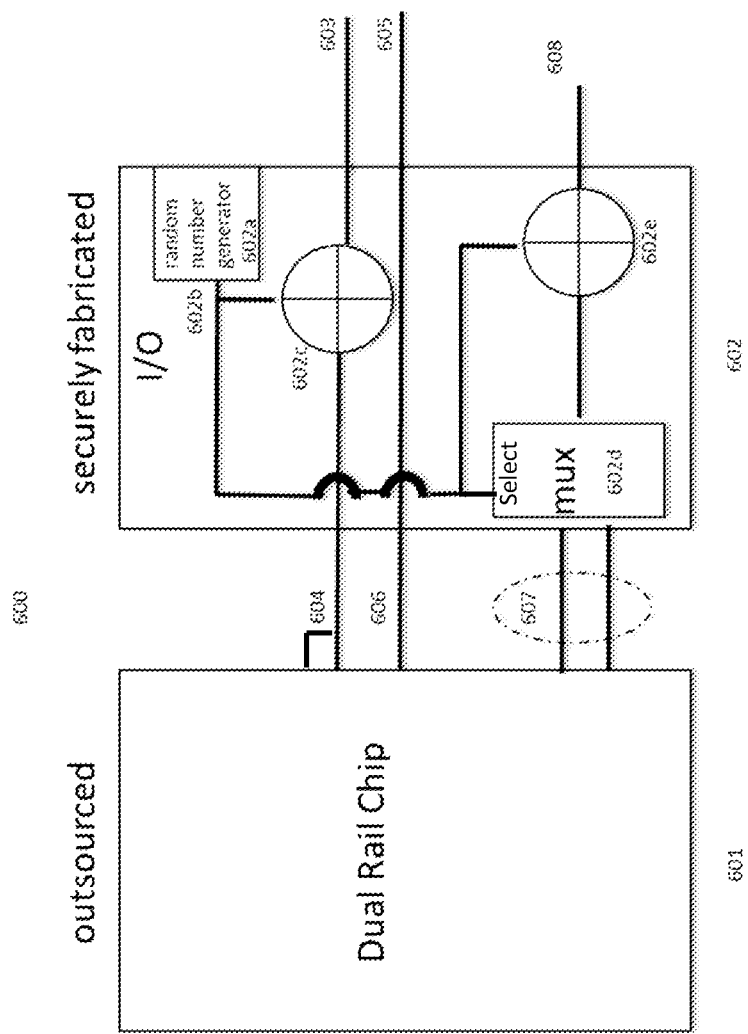
FIG. 6 is an embodiment of the partition method for designs implemented with the MUX-based methods illustrated in FIGS. 4 and 5.

Refer to FIG. 6 for an illustration 600 of the layout partition. The outsourced layout 601 contains all the logic blocks. The securely fabricated chip 602 contains a random number generator 602a to provide the random rail 602b. The securely fabricated chip 602 also contains XOR gates 602c that convert selected single rail input signals 603 to signals in dual-rail representation 604 that become inputs to 601. Other single rail input signals 605 can be directly sent as single rail inputs 606 to 601. The securely fabricated chip 602 also contains MUXes 602d and XOR gates 602e that are used to convert output signals 607 from 601, which are in dual-rail representation, back to single rail output 608. Note that the inputs to 601 can either be in dual-rail representation (e.g., 604) or single rail representation (e.g., 606). The random rail 602b would not exist anywhere on the outsourced chip 601 thus prohibiting direct monitoring of their values.

FIG. 6 and FIG. 4 can be viewed together to form a better understanding of an additional embodiment of the present invention. In one embodiment of the present invention, the input signals 604 and 606 communicate with at least two logic blocks 401 and 402. For example, the encoded input from the securely fabricated portion communicates with the at least two logic blocks as shown as 401a and 402a. At least one inverter may then be applied along a selected logic block from the at least two logic blocks in such a way that the at least two logic blocks are not identical. The term "at least" is used to illustrate that there could be any number of specified logic blocks or inverters depending on the complexity desired. Referring back to FIG. 4, the inverters were placed within one of the at least two logic blocks along every possible rail. It is foreseeable that the inverters may be placed in any number of combinations between the at least two logic blocks as long as they remain consistent with the rules set out in EQNs 3 & 4.

The addition of the at least one inverter to the at least two logic blocks presents a very novel and beneficial aspect to the present invention. If the at least two logic blocks were identical in nature, a potential attacker would have approximately a chance of ½ to guess on the correct logic bit for the random logic. The number would change based upon the amount of bits in the system, but the number would become smaller. For example, a 64-bit system would allow an attacker to have a $½^{64}$ chance of guessing the correct logic bit for the random logic. This is approximately 5.4210108624275221700372640043497e-20 which is an extremely small number. This demonstrates that successfully guessing becomes out of reach for the attacker. This is what the invention enforces: even in the presence of a hardware Trojan the attacker has to resort to guessing within a vast search space. Applying an inverter to the system assists in adding to the complexity, which contributes to decreasing the likelihood that an attacker could guess the correct logic bit. Ultimately, it can get to the level where it is prohibitive for an attacker to attempt to guess the correct logic value.

Figure 7:
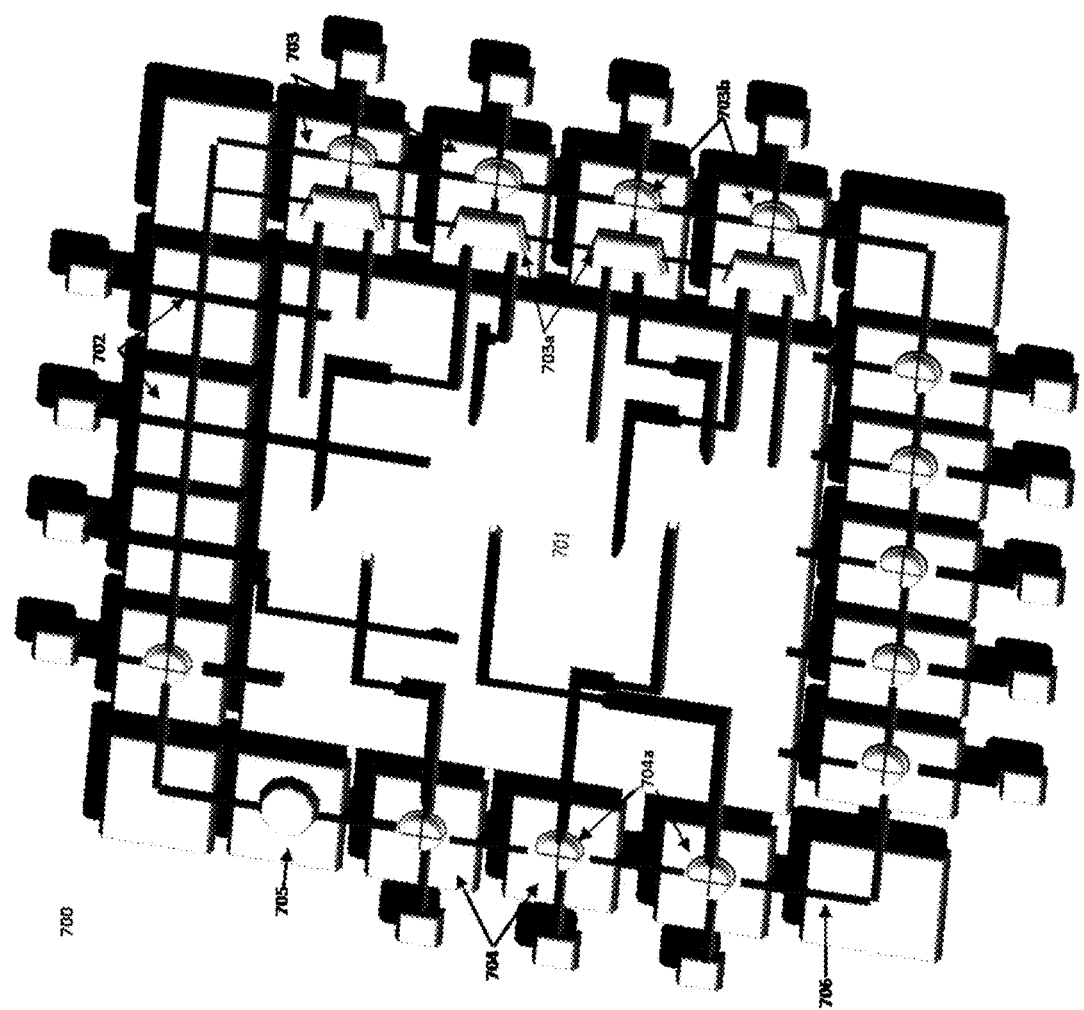
FIG. 7 is an illustration of one embodiment of the present invention.

Consider the fact that these I/O elements are replicated many times for each design, once for every input and output bit, and are interchangeable between designs. It is then possible to pre-fabricate them as standardized circuits in a secure facility for universal applications (as long as the locations of the I/O's are pre-defined as a standard). Refer to FIG. 7 for an example layout 700 using these quilt modules. The center piece 701 is the outsourced layout and contains all the logic. Two different input modules are needed: one (702) only contains straight pass-through wires for input and random rail 706 and one (704) for dual-rail conversion through an XOR gate 704a. A module 705 responsible for generating the random rail 706 is also needed. Each output module 703 contains a MUX 703a and an XOR gate 703b. Note that these modules and the layout pattern are independent of the combinational function being implemented, or the number of inputs that are converted to dual-rail. They can be either combined and quilted together.

Equivalent elements can be substituted for the ones set forth above such that they perform in substantially the same manner in substantially the same way for achieving substantially the same result.

A preferred embodiment of the present invention is implemented through mechanical processes without the need for software to assist in preventing data leakage through hardware Trojans. In fact, hardware is traditionally thought of as being a more secure platform because portions of a chip can be manufactured in controlled environments and avoid potential tampering. Despite the advantages associated with a strictly hardware invention it is anticipated that an embodiment of the present invention may be implemented through a combination of software and hardware. Such an embodiment could involve the application of software for implementing the random number generator. For example, a software implemented program could interact with the random number generator to create a specific bit value. Such a function would present a user with an option to create specific bit value known on the software side to encode logic. The software aspect of the present invention may extend further into specifying the random number created from the random number generator by controlling the randomly assigned value.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (anon-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C #, C++ or the like and conventional procedural programming languages, such as the "C" programming language or similar programming languages.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the claims below.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Glossary of Claim Terms

Computer chip: a piece of semiconducting material on which an integrated circuit is embedded.

Data Leakage: the unauthorized transfer of information from a computer or datacenter to an outside entity, location, or third party.

Hardware Trojans: a malicious modification to the physical circuitry of an integrated circuit that can deny, degrade, destroy, detect or disable information on, or functionality of, a computing device.

I/O: Input/Output area: operation, program, or device that transfers data to or from a computer.

Inverter: circuit that outputs voltage representative of the opposite logic level to its input. It inverts the input signal applied.

Logic blocks: an area that generally consists of a few logical cells. It is considered to be a building block upon which field-programmable gate array technology is built.

Logic gate: device implementing a Boolean function to produce a single logical output.

Logic input/output: logic input is information coming into a system while a logic output is information coming from a system. System could include a single apparatus, such as a single logic gate, or multiple apparatuses, such as two logic gates working in conjunction or independently to achieve a specific effect.

Malicious hardware: another name for a hardware Trojan. It is any hardware that can bring harm to a computer system.

Multiplexer (MUX): device utilized to increase the amount of data sent over a network by selecting one of several analogue or digital input signals, represented by $2^n$, and forwarding the selected input into a single line.

Quilt Packaging: an integrated circuit packaging and chip-chip-interconnect technology that utilizes conductive "nodules" fabricated to the sides of chips allowing two chips of different sizes and technologies to be joined.

Random variable: a value that may take on more than one value during the runtime of a program. Can be a numerical expression Random rail: path on which information or data from a random number generator runs.

XOR gate (Exclusive OR Gate): a digital logic gate that turns two or more inputs into one output.

What is claimed is:

1. A secure logic chip for preventing data leakage, comprising:
    an unsecure section and a secure section, wherein said secure section is inaccessible to malicious intrusion through secure fabrication, so as to secure entire said secure logic chip, wherein:
    said secure section comprises an input/output area communicating with said unsecure section comprising an external area;
    said external area contains logic blocks;
    said input/output area contains a random number generator, a random rail, a first logic gate, a second logic gate, and a multiplexer;
    said random number generator outputs a secure random logic value along said random rail;
    said random rail communicates with said first logic gate and said second logic gate;
    said first logic gate encodes a selected single rail input signal with said secure random logic value so as to output a secure encoded logic value for input into said external area;
    wherein said second logic gate receives a secure encoded logic value, selected by said multiplexer, from said external area, and decodes it with said secure random logic value, so as to produce an un-encoded logic output from said secure logic chip; and wherein said input/output area is integrated within said secure logic chip through the secure fabrication of quilt packaging.

2. The secure logic chip as in claim 1, wherein said first logic gate and said second logic gate is an XOR gate.

3. The secure logic chip as in claim 1, wherein said external area contains a first logic block and a second logic block; said first logic block and said second logic block communicating with said first logic gate and said multiplexer; said first logic block having an inverter along a rail communicating with said second logic gate.

4. The secure logic chip as in claim 3, wherein said second logic block has at least one inverter in such a way that it is not identical to said first logic block.

* * * * *